United States Patent
Debrock et al.

(10) Patent No.: US 10,188,988 B2
(45) Date of Patent: Jan. 29, 2019

(54) CLAUS UNIT TREATMENT OF SHUTDOWN TAIL GAS

(71) Applicant: ExxonMobil Research and Engineering Company, Annandale, NJ (US)

(72) Inventors: Matt E. Debrock, Houston, TX (US); James F. Colwell, Zachary, LA (US); Megan M. Richard, Houston, TX (US); Jon F. Gislain, Plainfield, IL (US); John D. Corley, Evergreen, CO (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 15/449,010

(22) Filed: Mar. 3, 2017

(65) Prior Publication Data
US 2017/0274324 A1    Sep. 28, 2017

Related U.S. Application Data

(60) Provisional application No. 62/312,166, filed on Mar. 23, 2016.

(51) Int. Cl.
*B01D 53/96* (2006.01)
*B01D 53/86* (2006.01)
*C01B 17/04* (2006.01)
*B01D 53/52* (2006.01)

(52) U.S. Cl.
CPC .............. *B01D 53/96* (2013.01); *B01D 53/52* (2013.01); *B01D 53/8603* (2013.01); *B01D 53/8612* (2013.01); *C01B 17/0417* (2013.01); *C01B 17/0447* (2013.01); *C01B 17/0452* (2013.01); *B01D 2251/102* (2013.01); *B01D 2257/304* (2013.01)

(58) Field of Classification Search
CPC ................ B01D 53/96; B01D 53/8612; C01B 17/0417; C01B 17/0447; C01B 17/0452
USPC ........................................................... 502/34
See application file for complete search history.

(56) References Cited

U.S. PATENT DOCUMENTS

| 4,183,823 A | 1/1980 | George |
| 4,954,331 A | 9/1990 | Lee et al. |

FOREIGN PATENT DOCUMENTS

CA    1299842 C    5/1992

OTHER PUBLICATIONS

The International Search Report and Written Opinion of PCT/US2017/020889 dated Jun. 30, 2017.

*Primary Examiner* — Edward M Johnson
(74) *Attorney, Agent, or Firm* — Glenn T. Barrett

(57) ABSTRACT

The process for configuring or reconfiguring a sulfur removal plant having a plurality of Claus units that is greater than the number of downstream tail gas treating units (TGTUs) allows for the regeneration of one of the Claus units without shutting down any of the downstream TGTUs or the other Claus units. Specifically, the regeneration tail gas can be diverted to the reaction furnace of an in-service Claus unit, thereby allowing excess oxygen to be used to regenerate the Claus unit more efficiently, and without exceeding environmental SO2 emission requirements.

7 Claims, 3 Drawing Sheets

CLAUS UNIT TREATMENT OF SHUTDOWN TAIL GAS

CROSS-REFERENCE TO RELATED APPLICATIONS

This application claims priority to U.S. Provisional Application Ser. No. 62/312,166 filed Mar. 23, 2016, which is herein incorporated by reference in its entirety.

BACKGROUND

The present invention relates to a novel process and system for eliminating high $SO_2$ emissions associated with Claus unit shutdowns, and the potential environmental regulatory violations associated therewith.

The Claus process is a catalytic chemical process that is used for converting gaseous hydrogen sulfide ($H_2S$) into elemental sulfur (S). This process is widely used to produce sulfur from $H_2S$ found in raw natural gas and from by-product sour gas streams derived from petroleum crude oil refinery processes such as amine gas treating and sour water stripping.

Claus unit feed gases have a wide range of compositions, ranging from less than 25 mol % $H_2S$ (from a sour water stripper and natural gas treatment facilities) to greater than 80 mol % $H_2S$ (from a refinery amine regenerator). The Claus technology can be divided into two process steps, thermal and catalytic. In the thermal step, the feed is combusted to convert $H_2S$ into $SO_2$ as follows:

$$2\ H_2S + 3\ O_2 \rightarrow 2\ SO_2 + 2\ H_2O \quad (1)$$

In the catalytic step, using activated aluminum (III) or titanium (IV) oxide, $H_2S$ reacts with the $SO_2$ formed during the thermal step to form elemental sulfur:

$$2\ H_2S + SO_2 \rightarrow 3\ S + 2\ H_2O \quad (2)$$

The overall process reaction can thus be expressed as:

$$2\ H_2S + O_2 \rightarrow 2\ S + 2\ H_2O \quad (3)$$

The tail gas from the Claus process still contains combustible components and sulfur compounds, and is either burned in an incineration unit or further desulfurized in a downstream tail gas treating unit (TGTU), such as, for example, the Shell Claus Off-gas Treatment (SCOT) technology that uses a Co—Mo catalyst bed followed by an amine treatment section.

It is typically necessary to shut down a Claus unit for inspection or repairs. Because it is common for large sulfur removal complexes to employ a number of parallel Claus units, it would be ideal to allow a single Claus train shutdown without the need to shut down the other parallel Claus trains or common TGTUs. This however has proven to be problematic.

As an example, a sulfur removal plant consists of two Claus units flowing into a single TGTU. It is desired to shut down one of the Claus units while the other Claus unit is processing refinery acid gas, thus preventing the entire shutdown of the sulfur removal complex and altering refinery operations. During the shutdown operation, natural gas is combusted in the Claus reaction furnace to strip sulfur from the Claus reactors. The tail gas from this shutdown operation consists therefore of natural gas combustion products ($CO_2$, $H_2O$, $N_2$), residual sulfur species (S, $H_2S$, $SO_2$, $SO_3$, COS, $CS_2$), with excess $O_2$ concentrations ranging from 0% (stoichiometric natural gas firing at the beginning of the shutdown sequence) up to 21% (pure air at the end of the shutdown sequence).

Referring generally to FIG. 1, a flow diagram is shown illustrating the problems associated with prior art methods for implementing the single Claus unit shutdown described above. While natural gas firing remains at stoichiometric $O_2$ concentrations (i.e., less than 0.5% excess $O_2$), the resultant tail gas is sent to the TGTU for processing. This occurs until sulfur production stops, at which time the tail gas is diverted from the operating TGTU directly to the incinerator and excess $O_2$ concentrations are introduced to the system. One of ordinary skill in the art will appreciate that excess air/$O_2$ can never be present in tail gas sent directly to the TGTU as this would damage the catalyst in the TGTU. As $O_2$ concentrations are increased in the furnace, the $SO_2$ concentration in the tail gas also increases as more sulfur species are removed. In order for the incinerator exhaust gas to remain below environmental regulations (e.g., 250 vppm), the tail gas must then be diverted back to the TGTU (to avoid an environmental exceedance). The process of diverting the shutdown tail gas back and forth between the TGTU and the incinerator is time consuming, and often results in the need to completely shut down the entire sulfur removal plant.

What is still needed is a reliable process improvement that allows the shutdown of one Claus unit while other parallel Claus units remain online processing refinery acid gas.

SUMMARY OF THE INVENTION

A method for regenerating a single Claus unit in a sulfur removal complex comprising a plurality of Claus units and a smaller number of tail gas treating units (TGTUs) is disclosed. The method comprising the steps of combusting natural gas in the regenerating Claus units' reaction furnace with excess oxygen; and sending the resulting tail gas to an in-service Claus unit's reaction furnace. No other Claus unit or TGTU is shut down during the regeneration of the single Claus unit in this embodiment, which is a significant improvement over the prior art. Importantly, diverting shutdown tail gas to the operating Claus unit processing refinery acid gas provides little to no impact on that unit's operation, as the excess $O_2$ in the tail gas contributes to the $O_2$ demand for the in-service Claus unit.

Specifically, the method includes the following steps for regenerating the single Claus unit: (a) switching the feed to the regenerating Claus unit's reaction furnace to natural gas; (b) combusting the natural gas in the reaction furnace using an approximately stoichiometric amount of oxygen; (c) sending the tail gas from the regenerating Claus unit to an in-service TGTU; (d) once liquid sulfur is no longer produced from the regenerating Claus unit condensers, sending the tail gas to an in-service Claus unit's reaction furnace; (e) incrementally adding excess oxygen, preferably up to about 10 mol % or greater, to the regenerating Claus unit's reaction furnace; and (f) once the regenerating Claus unit's tail gas contains an environmentally acceptable concentration of sulfur-containing species, sending the tail gas to an incinerator.

DETAILED DESCRIPTION

The present invention relates to a process re-configuration of a sulfur removal plant having a plurality of Claus units that is greater than the number of downstream tail gas treating units (TGTUs). It is often desirable to shut down and regenerate one of the Claus units without shutdown of any of the downstream TGTUs or the other Claus units. The present invention solves this problem, and can be implemented as both a grassroots design for a new sulfur removal plant, or can be implemented as a relatively low cost retrofit of an existing plant.

Figure 2:
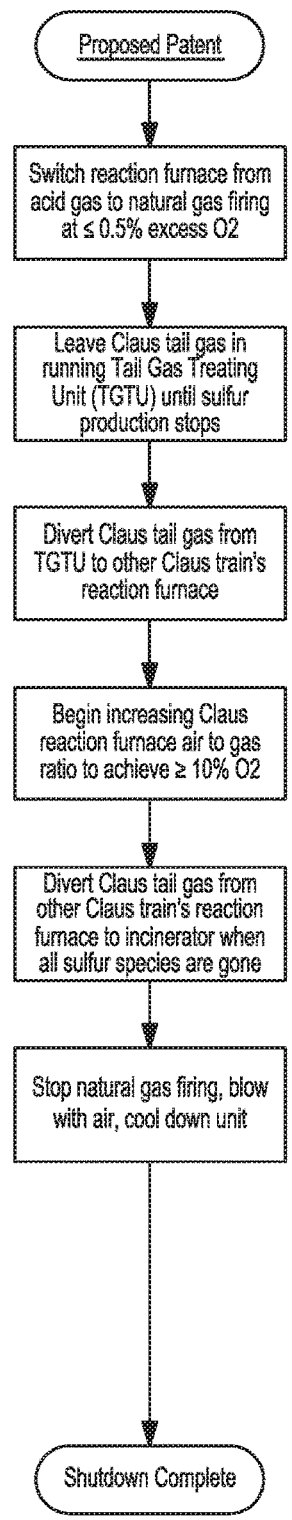
FIG. 2 is a simple flow diagram depicting a novel sequence for shutting down one Claus unit while other parallel Claus units remain online processing refinery acid gas, in accordance with the present invention.

Referring to FIG. 2, a simple flow diagram depicting a novel regenerating sequence for shutting down one Claus unit while other parallel Claus units remain online processing refinery acid gas, in accordance with the present invention, is provided. According to this sequence, the Claus unit that is being shut down is switched from refinery acid gas to natural gas firing at stoichiometric $O_2$ concentrations (i.e., less than 0.5% excess $O_2$). The tail gas from this unit is directed to the running TGTU until sulfur production stops, at which time the tail gas is then diverted to the feed of the other Claus unit's reaction furnace, which is still operating on refinery acid gas. At this time, excess $O_2$ is added in increasing increments, up to about 10 mol % or greater, to the shutdown furnace to remove additional sulfur-containing species. When the shutdown tail gas is substantially free of sulfur-containing species, the tail gas can then be diverted to the incinerator for environmentally safe disposal.

Figure 1:
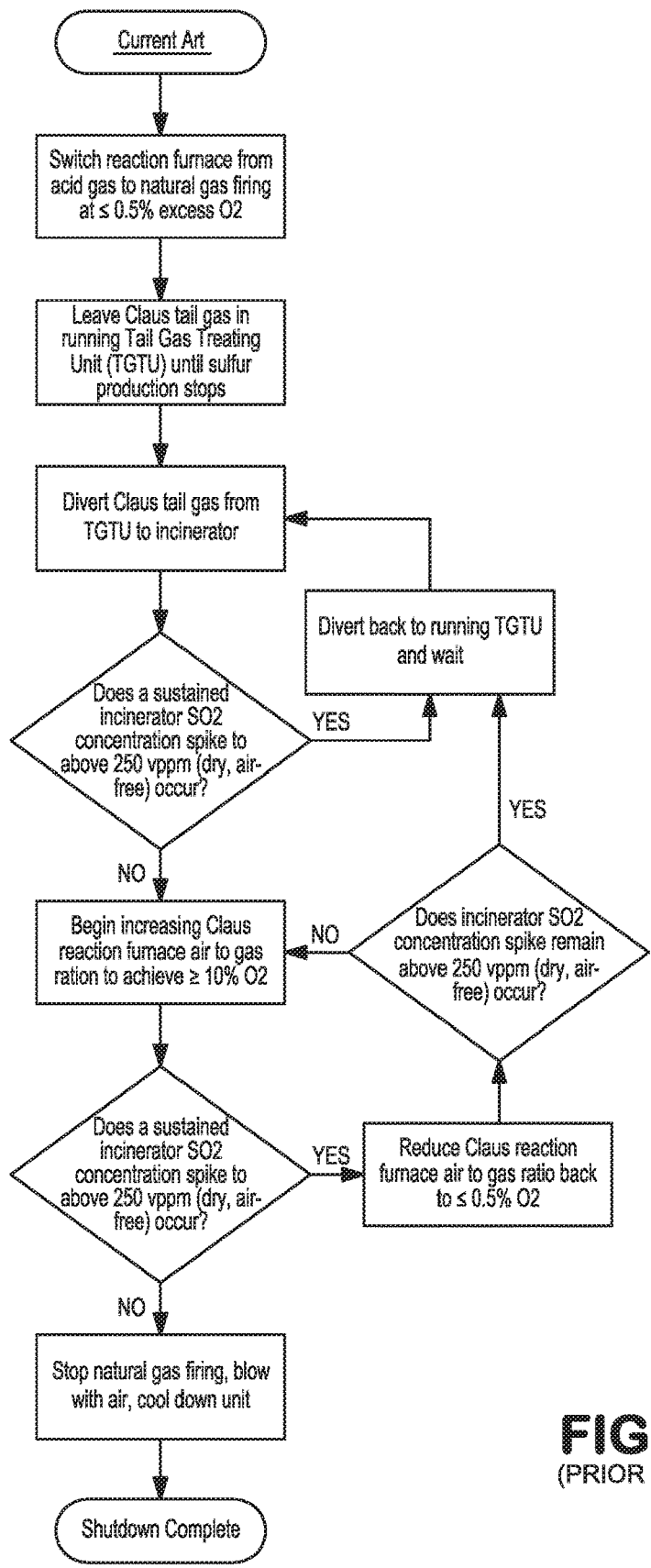
FIG. 1 (PRIOR ART) is a simple flow diagram depicting a prior art sequence for shutting down one Claus unit while other parallel Claus units remain online processing refinery acid gas.

The benefits of this novel regenerating sequence are numerous. Excess air/$O_2$ is necessary to fully remove sulfur species from the Claus reactor, however excess $O_2$ in the shutdown tail gas can never be introduced to an operating TGTU without passivating and then permanently damaging the TGTU catalyst. Furthermore, as described with the prior art shutdown sequence of FIG. 1, shutdown tail gas cannot be sent directly to an incinerator either because of environmental exceedance of $SO_2$ concentration limits. The present invention, as depicted in FIG. 2, provides a more efficient and timely Claus unit shutdown without damaging the operating TGTU and with no impact on sulfur plant incinerator $SO_2$ emissions. Diverting shutdown tail gas to the operating Claus unit processing refinery acid gas provides little to no impact on that unit's operation, as the tail gas excess $O_2$ contributes to the $O_2$ demand for the in-service Claus unit.

As such, the primary benefit is the ability to shut down one Claus unit without shutting down downstream TGTUs or other parallel Claus units, which minimizes the impact of the Claus unit shutdown on overall refinery operations. Although the present invention is primarily directed to sulfur removal complexes having a number of Claus units that is greater than the number of downstream TGTUs, one of ordinary skill in the art will appreciate that the present invention provides benefit to a Claus unit that is dedicated to a single downstream TGTU. In this instance, diverting the shutdown tail gas will result in caustic savings as the TGTU quench tower does not have to be utilized as an $SO_2$ scrubber.

Figure 3:
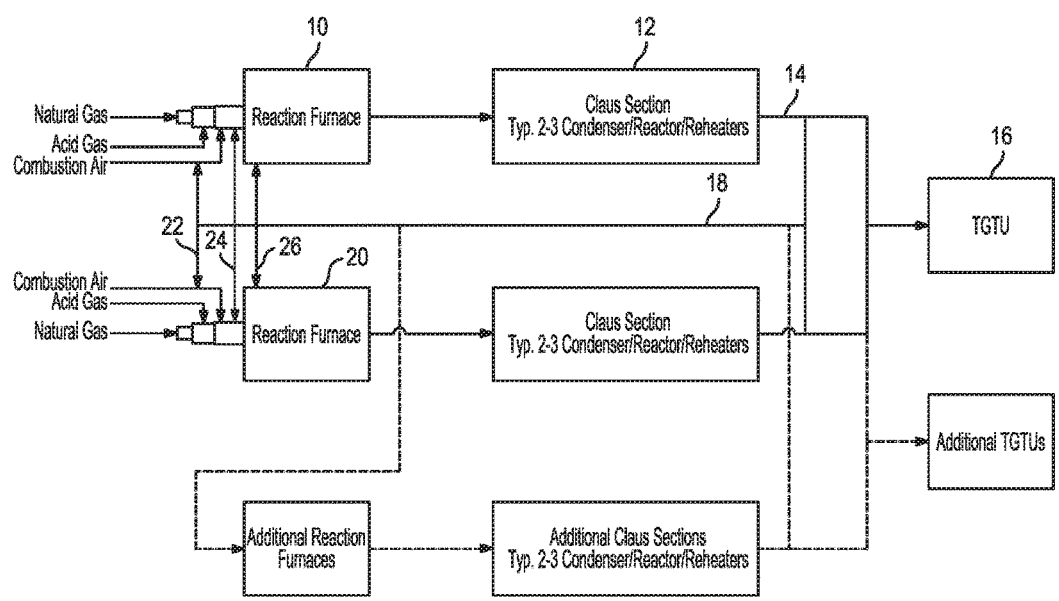
FIG. 3 depicts illustrative configurations for a sulfur removal plant having two Claus units and a single TGTU, in accordance with the present invention.

One of ordinary skill in the art will appreciate that the present disclosure embodies numerous alternative configurations for accomplishing the regeneration sequence of FIG. 2. FIG. 3, for example, illustrates several configurations for a sulfur removal plant having two Claus units and one TGTU, in accordance with the teachings of the present invention. Natural gas is first combusted in the reaction furnace 10 of the Claus train being shut down to strip sulfur from the Claus section 12. Tail gas stream 14, consisting of natural gas combustion products ($CO_2$, $H_2O$, $N_2$) and residual sulfur species (S, $H_2S$, $SO_2$, $SO_3$, COS, $CS_2$), is then blocked away from TGTU 16, and is diverted through jumpover piping 18 to the reaction furnace 20 of the in-service Claus train processing refinery acid gas. As shown in FIG. 3, tail gas stream 14 can be introduced to reaction furnace 20 at several points, including, but not limited to, combustion air piping 22, burner air plenum 24, or a reaction furnace dedicated nozzle 26. Jumpover piping 18 and associated valving is constructed such that either train's tail gas during shutdown can flow to the other reaction furnace. A person having ordinary skill in the art will appreciate that certain straightforward design aspects are important for jumpover piping 18, including, without limitation, heat conservation (such as steam jacketing), no low points, and a nitrogen purge for when it is not being used.

It is envisioned that the teachings of the present invention can be incorporated into the retrofit or debottleneck of an existing sulfur removal complex using well-known engineering and safety standards. The teachings of the present invention can also be utilized in the initial design of a grassroots sulfur removal complex, including the additional capital benefit of requiring fewer, shared TGTU units for the required Claus units.

Additional Embodiments

According to certain teachings of the present invention, a method for regenerating a Claus unit in a sulfur removal complex comprising a plurality of Claus units and a smaller number of tail gas treating units (TGTUs) is provided. The method comprises the steps of: (a) switching the feed to the regenerating Claus unit's reaction furnace to natural gas, (b) combusting the natural gas in the reaction furnace using an approximately stoichiometric amount of oxygen, (c) sending the tail gas from the regenerating Claus unit to an in-service TGTU, (d) once liquid sulfur is no longer produced from the regenerating Claus unit in step (b), sending the tail gas to an in-service Claus unit's reaction furnace; and (e) adding excess oxygen to the regenerating Claus unit's reaction furnace. The tail gas in step (d) can be sent, without limitation, to the combustion air piping for the in-service Claus unit's reaction furnace, the air plenum for the in-service Claus unit's reaction furnace, or to a dedicated nozzle on the in-service Claus unit's reaction furnace. Once the tail gas from the regenerating Claus unit after step (e) contains an environmentally acceptable concentration of sulfur, sending the tail gas to an incinerator.

Another embodiment of the present invention is a method for regenerating a single Claus unit in a sulfur removal complex comprising a plurality of Claus units and a smaller number of tail gas treating units (TGTUs), the method comprising the steps of combusting natural gas in the regenerating Claus units' reaction furnace with excess oxygen; and sending the resulting tail gas to an in-service Claus unit's reaction furnace. No other Claus unit or TGTU is shut down during the regeneration of the single Claus unit in this embodiment.

Yet another embodiment of the present invention is a system for removing sulfur from a refinery acid gas stream, comprising a plurality of Claus units, wherein each Claus unit has a reaction furnace; at least one tail gas treating units (TGTUs), wherein the number of TGTUs is smaller than the number of Claus units; and means for connecting the tail gas from any of the plurality of Claus units to the reaction furnace of any of the plurality of Claus units. The connecting means includes piping for connecting the tail gas from any of the plurality of Claus units to either the combustion air piping, the air plenum, or a dedicated nozzle for any of the plurality of Claus units. In this manner, the system can be used to send the tail gas from a regenerating Claus unit to the reaction furnace of an in-service Claus unit.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Whenever a numerical range with a lower limit and an upper limit is disclosed, a number falling within the range is specifically disclosed. Moreover, the indefinite articles "a" or "an", as used in the claims, are defined herein to mean one or more than one of the element that it introduces.

The invention claimed is:

1. A method for regenerating a Claus unit in a sulfur removal complex comprising a plurality of Claus units and a smaller number of tail gas treating units (TGTUs), the method comprising the steps of:
    (a) switching a feed to a regenerating Claus unit's reaction furnace to natural gas;
    (b) combusting the natural gas in the reaction furnace using an approximately stoichiometric amount of oxygen;
    (c) sending tail gas from the regenerating Claus unit to an in-service TGTU;
    (d) once liquid sulfur is no longer produced from the regenerating Claus unit in step (b), sending the tail gas to an in-service Claus unit's reaction furnace; and
    (e) adding excess oxygen to the regenerating Claus unit's reaction furnace.

2. The method of claim 1, wherein the excess oxygen is increased incrementally up to about 10%.

3. The method of claim 1, further comprising:
    (f) once the tail gas from the regenerating Claus unit after step (e) contains an environmentally acceptable concentration of sulfur, sending the tail gas to an incinerator.

4. The method of claim 1, wherein the tail gas in step (d) is sent to the combustion air piping for the in-service Claus unit's reaction furnace.

5. The method of claim 1, wherein the tail gas in step (d) is sent to the air plenum for the in-service Claus unit's reaction furnace.

6. The method of claim 1, wherein the tail gas in step (d) is sent to a dedicated nozzle on the in-service Claus unit's reaction furnace.

7. A method for regenerating a single Claus unit in a sulfur removal complex comprising a plurality of Claus units and a smaller number of tail gas treating units (TGTUs), the method comprising the steps of:
    combusting natural gas in a regenerating Claus units' reaction furnace with excess oxygen; and
    sending resulting tail gas to an in-service Claus unit's reaction furnace;
    wherein no other Claus unit or TGTU is shut down during the regeneration of the single Claus unit.

* * * * *